United States Patent [19]

Rando et al.

[11] Patent Number: 4,795,389
[45] Date of Patent: Jan. 3, 1989

[54] METHOD OF MAKING AN ION LASER TUBE

[75] Inventors: Joseph F. Rando, Los Altos Hills; Eric W. Blumer, Sunnyvale, both of Calif.

[73] Assignee: Spectra-Physics, Inc., San Jose, Calif.

[21] Appl. No.: 913,163

[22] Filed: Sep. 29, 1986

[51] Int. Cl.⁴ .............................................. H01J 9/18
[52] U.S. Cl. .......................................... 445/28; 445/23
[58] Field of Search ..................... 445/22, 23, 26, 28, 445/29, 33, 35, 44, 46; 238/903

[56] References Cited

U.S. PATENT DOCUMENTS 4,176,892 12/1979 Wright .................................. 445/28
4,685,109 8/1987 Carlson et al. ........................ 445/28

Primary Examiner—Kurt Rowan
Attorney, Agent, or Firm—Paul Davis

[57] ABSTRACT

An ion laser includes a plurality of thin refractory metal disk members with the perimeter of the disks embedded directly into a ceramic plasma tube. A central aperture is formed in the middle of each disk, and a plurality of apertures are formed around the periphery of the disk. In the fabrication process, ceramic powder is compacted to form an outer plasma tube. Two separate tubes, each with electrodes and embedded washer ends, can be formed and fused to form a single tube. The disks (with the surrounding compacted ceramic disposed around the periphery of the disk) are stacked within the plasma tube and the green ensemble of ceramic and metal is fired in only one furnace step with controlled atmosphere. Hermetic cathode and anode electrodes are also formed in the same firing through the plasma tube. Ends are sealed with a mirror-mount of the Brewster window structure, in one embodiment either laser welded or soldered to a refractory metal end disk embedded in the green ceramic at the ends of the tube. The tube can be either air or water cooled. The number of furnace steps and parts necessary for the ion laser is reduced.

19 Claims, 7 Drawing Sheets

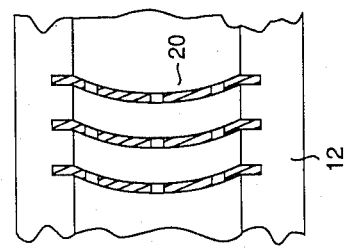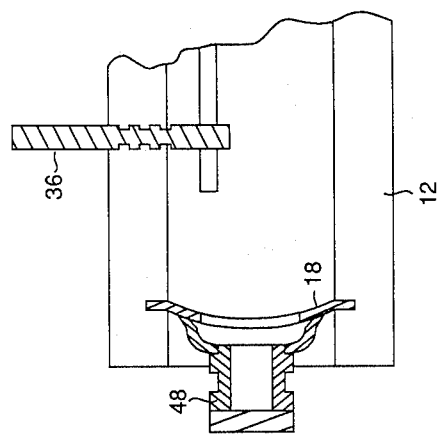
FIGURE 1A. DETAILS

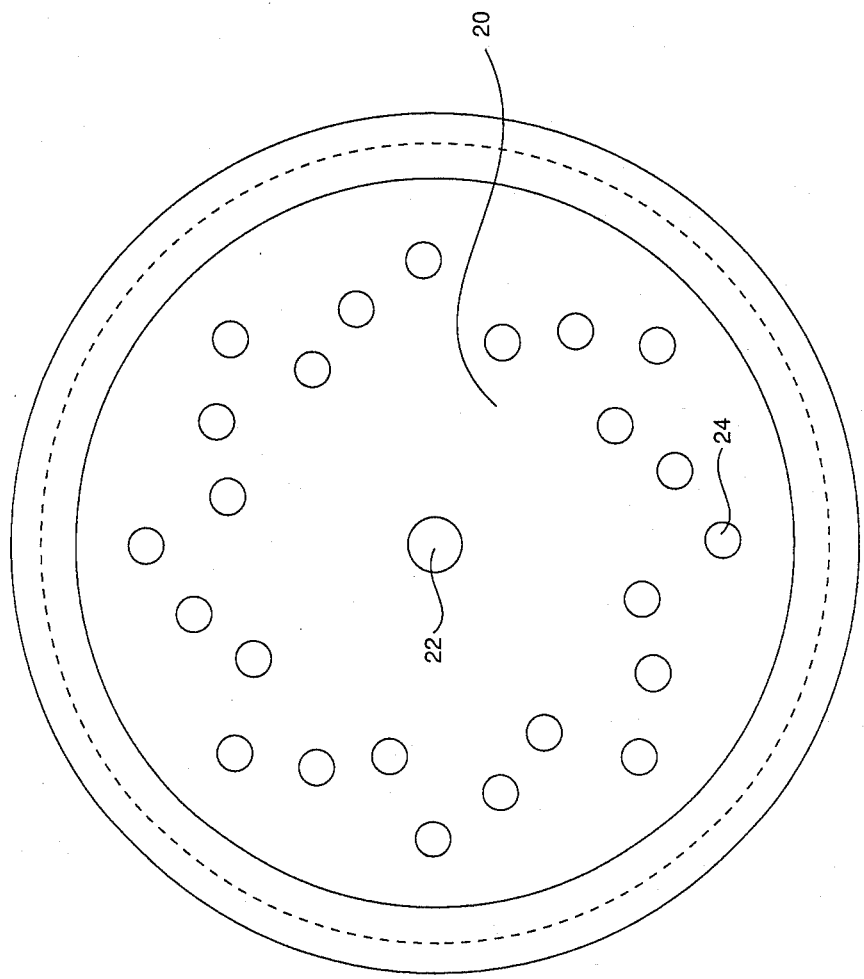

METHOD OF MAKING AN ION LASER TUBE

FIELD OF THE INVENTION

This invention relates generally to ion lasers, and more particularly, to ion lasers defined by a plurality of adjacent refractory metal disks surrounded by an annular ring of ceramic and the fabrication process thereof.

BACKGROUND OF THE INVENTION

Generally, ion lasers are presently made using metal ceramic technology by first constructing a ceramic tube using the following conventional processes: isopressing; firing; and diamond turning to achieve the precise dimensions. Following formation of the ceramic tube, various elements are brazed onto the tube using complicated and expensive metal to ceramic sealing techniques.

In one current method of manufacture, the ends of the ceramic tube are fired with a paste to form a metal layer. This is then nickel-plated and subsequently brazed in another process. This technology requires three furnace operations: formation of the ceramic; application of the metallization; and the brazing itself.

Current ion laser technology requires numerous process steps and employs many parts and many complex hermetic seals. This complexity increases the laser cost and the difficulty to manufacture.

Accordingly, it would be an advancement in ion laser technology to provide such a laser with fewer parts and which requires less processing steps during its manufacture. It would be a further advancement in the art if the body of the tube with several hermetic seals could be made in only one or a minimum number of furnace operations.

SUMMARY OF THE INVENTION

Accordingly, it is an object of the present invention to provide an ion laser having a less complex structure.

Another object of the present invention is to provide an ion laser with a substantially reduced number of internal parts defining the gas discharge region.

A further object of the present invention is to provide an ion laser whereby the plasma tube is formed in only one (or a minimum number of) firing step(s).

Yet another object of the present invention is to provide an ion laser whereby thin refractory metal disk members each include a ceramic annulus which becomes embedded in a ceramic tube during a single firing step. The disks are thin enough and have an appropriate expansion coefficient that they do not break the ceramic on cooling after the firing operation.

Another object of the present invention is to provide an ion laser which is hermetically sealed with a ceramic to refractory metal end washer at the tube ends. The cathode can be inserted through the hole in the washer and can be laser welded closed, thus avoiding subsequent firing as needed in brazing or fritting.

Another object of the present invention is to provide a simple hermetic electrode seal through the ceramic tube wall for anode and cathode electrical connections.

These and other objects of the present invention are achieved by providing an ion laser which comprises a substantially cylindrical ceramic tube. A plurality of thin disk members are included. Each one has a central aperture which defines a plasma discharge region extending substantially along a longitudinal axis of the tube. A plurality of apertures are disposed substantially at the periphery of each disk to provide equalization of pressure within the interior of the tube. An annulus of ceramic is formed around the periphery of each disk to mechanically hold the disk in the tube, providing good thermal transport. A cathode and anode are disposed at generally opposing ends of the tube. Means are included for hermetically sealing each opposing end of the tube as well as mirror or window means at each opposing end.

In another aspect of the present invention, a method is provided for assembly and construction of an ion laser tube, much of which takes place before firing. Ceramic powder and binder are formed into a substantially solid longitudinal tube, defining a longitudinal axis for flow of a gas discharge between an anode and a cathode. An annulus of green ceramic is formed around a periphery of each individual bore disk member with the thin disk embedded in the alumina a sufficient distance to allow the needed heat transfer from the disk through the ceramic to the outer wall. Each bore disk member includes a central aperture and a plurality of apertures disposed substantially adjacent to the ceramic annulus. A plurality of the disk members in the green state are stacked in an interior of the longitudinal green alumina tube substantially perpendicular to the longitudinal axis. In the formation of the alumina around the metal disk, care is taken to position the central aperture-center of the alumina annulus. Therefore, when the bore disks are stacked, all the central apertures are in line. The disk members and tube are sintered or fired together in one step to form a unitary structure with the disk members being embedded in the tube. The alumina/alumina boundaries fuse together, while the thin bore disks are held in place. As the assembly cools, there is some buckling of the disks which reduces the built-in stress and avoids breakage.

During the ceramic firing, the atmosphere around the structure must be controlled and changed as a function of temperature to allow the ceramic binders to burn out or oxidized at the low temperature and to avoid oxidation of the refractory metal at the high temperature. The atmosphere at the high temperature may contain some hydrogen for reducing oxides but must be free of oxygen.

The present invention provides an ion laser tube which substantially reduces the number of component parts necessary to sustain a gas discharge sufficient to cause the needed population inversion.

In another aspect of the invention, green ceramic power is isopressed to form an elongated cylindrical plasma tube with refractory metal such as tungsten and moly-rhenium pins through the wall. Molds are designed to allow the core to hold the pins in place during isopressing, and the core is removed later. Disks made of refractory metals, including but not limited to tungsten, have a compacted annulus of ceramic disposed around the periphery of the disk. A stack of disks, with the surrounding ceramic, are placed in the interior of the tube. Each disk is separated from its neighbor by a distance approximately equal to the thickness of the ceramic annulus.

The bore assembly with the electrode embedded in the wall is fired only once, and the green ceramic of the tube, as well as that surrounding the disks, is processed in one furnace operation. Lasing operation is achieved with far fewer component parts than previously utilized, and the number of heating-processing steps is reduced from three to one. The overall result is a significant improvement over conventional ion lasers Again, the present invention provides advantages over conventional ion lasers due to a decrease in complexity with the laser itself and its manufacture, both of which result in cost reductions. The number of disks is easily increased to provide a more-uniform plasma and thus reduces the differential pressure caused by using fewer disks.

Conventional processes, such as isopressing followed by diamond turning, have been utilized to achieve precise dimensions. Various elements must then be brazed onto the ion laser. In addition to the limitation on the number of furnace steps, processes to prepare the interior of the tube are greatly simplified. Essentially, the present invention reduces the number of processes and parts by installing the apertures and electrodes necessary for the plasma at the time the ceramic is manufactured.

DETAILED DESCRIPTION OF THE DRAWINGS

Figure 1:
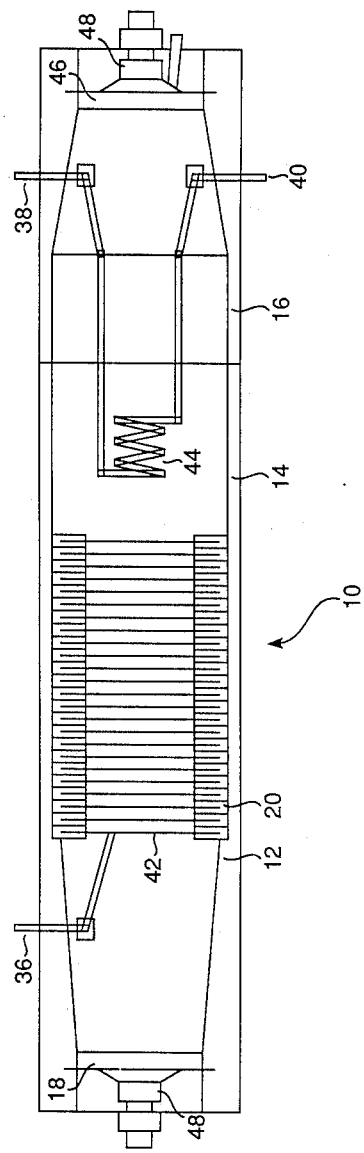
Figure 3:
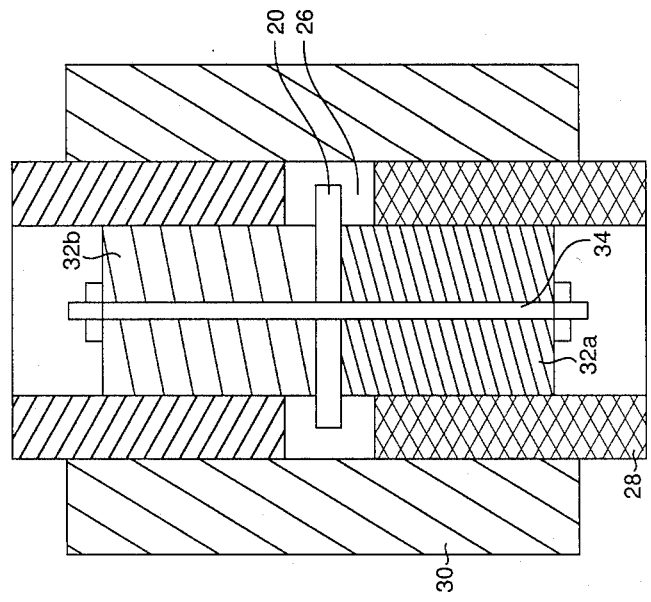
Figure 4:
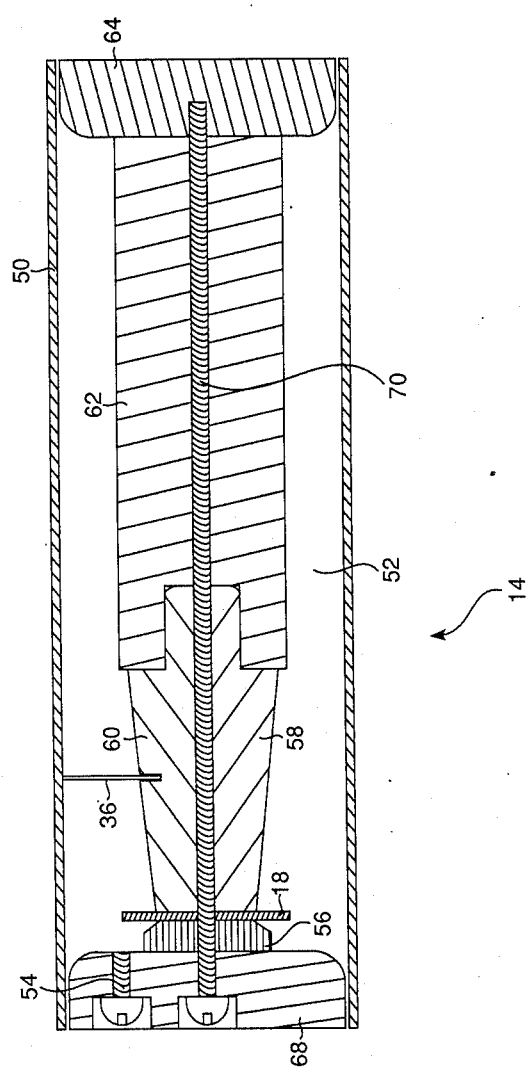
Figure 5:
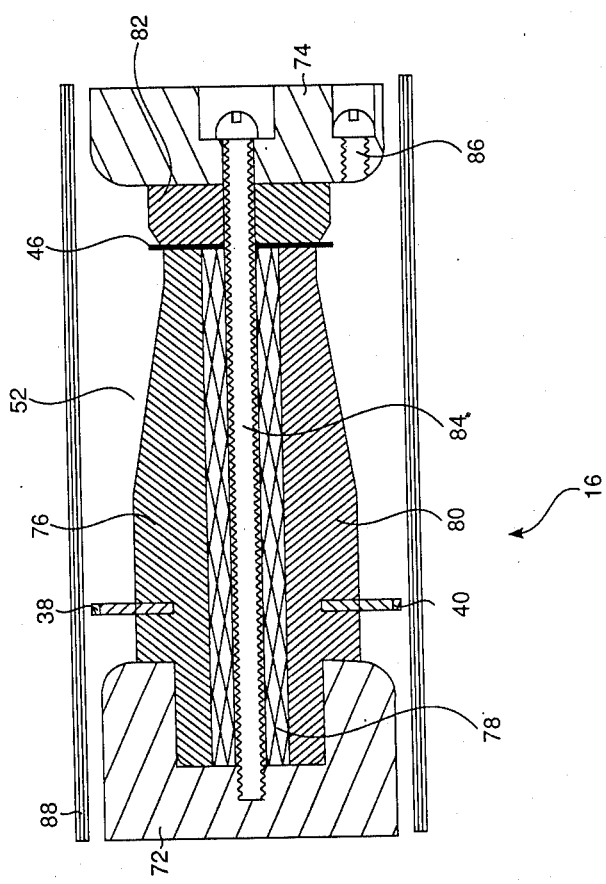
Figure 6:
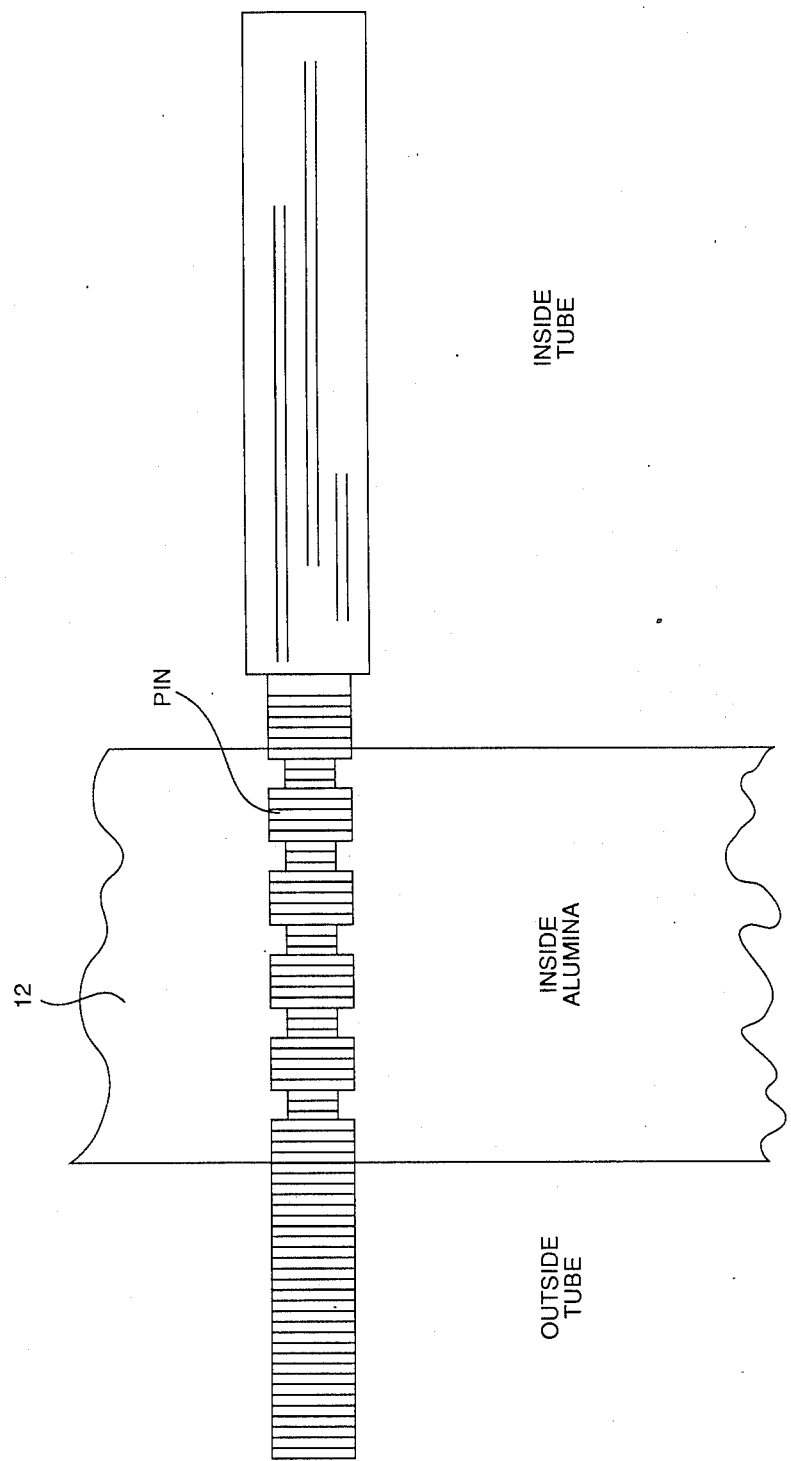

1. FIG. 1 is a sectional schematic view of one embodiment of the present invention.
2. FIG. 1a is a closer view of the sectional schematic view of FIG. 1.
3. FIG. 2 is a plan view of the surface of a bore disk member used with the present invention.
4. FIG. 3 is a sectional schematic view of an exemplary apparatus which can be used for purposes of the present invention to form the compacted ceramic annulus around the periphery of a bore disk.
5. FIG. 4 is a schematic view illustrating green core and mold used to form a bore section of a green ceramic plasma tube utilized in one embodiment of the present invention, which includes the core for holding the electrode and end sealing disk.
6. FIG. 5 is a schematic view illustrating core and mode used to form the cathode section of a green ceramic plasma tube utilized in one embodiment of the present invention.
7. FIG. 6 is a schematic view of an electrode embedded in the ceramic wall.

Description of the Preferred Embodiments

The present invention is an ion laser and the method of forming the same, comprising a plurality of relatively-thin refractory metal bore disks embedded in a ceramic tube which form the bore. The tube forms the vacuum enclosure with the aid of an end disk at each end, and supports the metal bore disks. Essentially, the ceramic structure is formed with the bore disks positioned within the interior of the tube. Cooling of the tube is achieved either by water flowing in a surrounding relationship or by air on the outside of the tube.

Each bore disk has a central aperture, permitting the passage of the plasma, and has a plurality of apertures at the periphery to allow for equalization of pressure.

The hermetic seal at the tube ends, between the refractory metal end disks and the ceramic at the laser tube ends, is achieved by forming the ceramic in the green state as a relatively fine powder in surrounding relationship to the refractory metal.

In this embodiment, alumina powder, for example, 85% alumina powder, is isopressed around tungsten bore disks. When the two are fired together, the ceramic shrinks, making a good mechanical and thermal contact with the refractory metal bore and end disks. As the ceramic cools from the firing temperature, the ceramic contracts more rapidly than the metal. Pressure on the metal is increased which further creates a vacuum seal needed for the end disks. In addition, metal oxides formed in the firing process further aid the sealing.

In this embodiment the refractory metal electrodes are installed in the core. During the ceramic isopressing stage used to compact the powder, the pins are held in place. During the firing of the ceramic, the pins form a vacuum seal to the alumina.

To form the bore disk member, an annulus of ceramic is mechanically pressed around the tungsten disk. A press with an annular piston and an unsupported center section is used. Ends of the ceramic tube are sealed with a refractory metal end annulus embedded in the wall with a larger aperture for subsequent insertion of the cathode assembly. These apertures are closed after cathode insertion using processes including but not limited to laser welding, laser soldering, and the like. In this way, the body of the tube is made in one furnace step. In another embodiment, the bore assembly can be brazed to a conventional cathode or anode section of a conventional laser.

Although different methods for forming the laser tube can be employed, in one embodiment the tube comprises two distinct sections which are fused during the firing process. The assembly of the parts is done vertically with the bore disk members stacked vertically inside one tube section. A second tube section is placed on top of the other, and an additional weight is used to improve fusion. The pressure between the two tube sections is sufficient to cause the fusion during the firing which results in a hermetic seal.

Referring to FIGS. 1 and 1a, the preferred embodiment of the present invention is illustrated. An ion laser is generally denoted as 10. A plasma tube 12 is formed of a suitable material and can be, by way of example, a ceramic such as alumina. In one embodiment the ceramic is 85% alumina such as available from the Glass Beads Co. of La Trope, Pa. The choice of alumina and refractory metal and its thickness is such that the expansion coefficient difference is small enough that stress induced fractures do not occur after firing. As shown in FIG. 1, plasma tube 12 is comprised of two tube sections 14 and 16, respectively, which are fused together during the one-step firing process.

Disposed at the open end of tube 14 is a thin refractory metal disk 18 (0.005 inch to 0.015 inch thick) and includes a large aperture. Element 18 can be made of different materials. Exemplary materials include but are not limited to tungsten, molybdenum-rhenium (approximately 50% rhenium), other refractory metals, and the like.

Within the interior of ion laser 10 are a plurality of bore disk members 20. FIG. 2 illustrates the surface of above disk member 20. As shown, a central aperture 22 is positioned in the middle of the disk member 20. Its purpose is to restrict the flow of the plasma between an anode and a cathode in a small region, resulting in a population inversion. Around the periphery of disk 20 are a plurality of smaller apertures 24. Apertures 24 provide for equalization of pressure and provide the gas return within the interior of tube 12. For example, a hole with 90% of the area of the central aperture 22 The number being sufficient to equalize the pressure between disks.

Disk 20 is made of a refractory metal including but not limited to tungsten. Compressed around the periphery of disk 20 is a layer of ceramic 26. In one embodiment, the ceramic is alumina. However, it will be appreciated that the present invention is not limited to the specific ceramics and refractory materials disclosed herein.

The actual dimensions of disk members 20 can vary depending upon any number of different parameters. In the preferred embodiment, disks 20 are made of tungsten sheet and are on the order of 5 to 10 thousandths-inch thick. (Thin disks are necessary to allow for buckling as the alumina cools, thus avoiding fracture of the tube.) For example, a disk 1.25-inch in diameter is supported by a ceramic annulus with a 1.15-inch inside dimension, a 1.35-inch outside dimension, and a thickness of 0.1 inch. Referring to FIG. 3, an apparatus is illustrated showing the formation of ceramic layer 26 around disk 20.

Pistons 28 and 30 compress powdered ceramic to form a solidified (non-powdered form) ceramic annulus 26 by compressing and the like. Piston 28 exerts a compressing force, and in combination with piston 30, the powder is confined, so the resulting annulus 26 is formed. A moving member 32 centers the disk 20.

Once the powder ceramic is in place, a force is applied by piston 28 and compresses the powder under pressure conditions of about 10,000 to 20,000 pounds/inch$^2$ pressure. Moving member 32 finds its appropriate place without applying force, seals, and positions disk 20. Engaging means such as a screw member 34 holds part 20 between parts 32A and 32B.

With reference once again to FIG. 1, twenty-four disk members 20 are positioned in the interior of tube 12. Refractory metal pins 36, 38, and 40 (moly-rhenium and the like) are embedded in the green state into the wall of tube 22 and serve as anode and cathode connectors. A hermetic seal is created by the intimate contact of the metal, its oxide, and the alumina. The pins 36, 28 and 40 may be grooved circumferentially to enhance its strength as illustrated in FIG. 6. The grooving of the pin enhances the mechanical strength and seal by increasing the surface area, inhibiting damage during assembly, and eliminating axial imperfections which could leak. Anode 42 may be by way of example an end disk member 20. Cathode 44 is of conventional design.

At the end of tube 16 is a refractory metal end disk 46 which is embedded in tube 16. Both ends of tubes 14 and 16 have a mirror mount 48 which may be subsequently laser welded or brazed. A Brewster window assembly 50 might also be used in place of a mirror assembly.

The number of disk members 20 disposed in tube 12 is capable of variation, as is the length and diameter of the tube.

The temperature needed to fire the tube can vary, but in one embodiment, it is about 1400° to 1600° C. Firing temperatures vary according to the ceramic materials employed and is supplied by the alumina vendor. The atmosphere of the furnace used for firing must be controlled to allow the binder to burn out at a low temperature, for example, less than 500° C., and avoid oxidizing the metal at high temperatures.

As shown in FIG. 4, an apparatus (in schematic exploded view) which can be used to compact the green ceramic powder and form tube 14 is illustrated. A confining member 50, such as a rubber cylinder, fits around the apparatus. Powder 52 is then poured into the rubber cylinder (through an apparatus 54), which houses the different parts utilized to confine the powder in the desired geometric configuration, typically a tubelike structure. The core assemblies 56, 52, 60 and 62 are designed to hold the electrode 36 and the end disk 18 while the green ceramic powder 52 is poured through aperture 54 into the mold which consists of ends 68 and 64 between the rubber tube 50. The core is supported by a threaded rod 70 during the filling and isopressing processes. In the disassembly of the core and mold after isopressing, ends 68 and 64 are removed first, followed by 62 add 56. The core section 58 must then be removed to allow 60 to slide off the electrode 36 for its subsequent removal from the green alumina tube 14.

During the conventional isopressing process, the entire assemble is placed in an oil bath, and pressure is increased to 10,000 pounds per square inch. To avoid oil leaking into the mold, the rubber hose 50 is clamped to the end 64 and 68 using conventional hose clamps.

FIG. 5 illustrates the confining apparatus used to compact the ceramic powder and form tube 16. The core assemblies 76, 78, 80 and 82 are designed to hold the electrode 38 and 40 and the end disk 46 while the green alumina powder 52 is poured through aperture 86 into the mold which consists of ends 72 and 74 between the rubber tube 88. The core is supported by a threaded rod 84 during the filling and isopressing processes. In the disassembly of the core and mold after isopressing, ends 72 and 74 are removed first followed by 82. The center core section 76 is then removed allowing section 76 and 80 to slide off the pins 38 and 40, respectively. This leaves the formed tube section 16 with the electrodes 38 and 40 in place with the end disk 46.

Tube 12 need not be a smooth exterior surface cylinder, and in one embodiment, the exterior is generally cylindrical but has a portion with a plurality of grooves formed therein to facilitate the removal of heat.

While preferred embodiments of the invention have been illustrated and described, it will be appreciated that the present invention should not be limited to the precise details set forth, but should be availed to such changes and alterations as may fall within the purview of the following claims.

We claim:

1. A method of constructing bore structure for an ion laser tube, comprising:
    forming ceramic powder into a substantially solid longitudinal tube defining a longitudinal axis for a gas discharge between an anode and a cathode;
    forming an annulus of ceramic around a periphery of a bore disk creating a disk member, said disk member including a central aperture permitting flow of said gas discharge and a plurality of apertures disposed substantially adjacent to said annulus of ceramic;
    stacking a plurality of said bore disk members in an interior of said longitudinal tube substantially perpendicular to said longitudinal axis; and
    firing said bore disk members and tube in one furnace operation step at a sufficient temperature and duration to form a unitary structure with said bore disks being embedded in said tube.

2. The method of claim 1, wherein said annulus of ceramic is compressed around the periphery of said bore disks.

3. The method of claim 1, wherein said disk members and tube are heated initially in an oxygen atmosphere for binder burn-out and an oxygen-free environment at fusing temperature.

4. The method of claim 1, wherein said solid longitudinal bore structure is formed with an interior step for supporting said plurality of stacked disk members during heating of said 5. The method of claim 1, further comprising hermetically sealing opposing end disks of said tube.

6. The method of claim 5, wherein each end disk of said tube is sealed with a mirror assembly using brazing.

7. The method of claim 6, wherein said mirror assemblies are laser welded to an end disk of said tube.

8. The method of claim 6, wherein said mirror assemblies are soldered to said end disks of said tube.

9. The method of claim 1, wherein said tube comprises two distinct tube members.

10. The method of claim 1, wherein one tube member is stacked on the other in a contacting relationship and then fired to form a hermetically sealed, unitary tube.

11. The method of claim 1, wherein said ceramic is alumina.

12. The method of claim 1, wherein said bore disk is a refractory material.

13. The method of claim 1, wherein said bore disk is tungsten disk.

14. A method of constructing an ion laser tube, comprising:

providing the bore structure of claim 1; and forming end disks at opposing ends of said tube prior to firing said bore structure, said end disks including electrode structures.

15. The method according to claim 14, wherein said end disks are formed in an alumina isopressing process with a core and mold to provide for removal of said core without creating cracks in the isopressed alumina.

16. The method according to claim 14, wherein said electrode structures are formed in an alumina isopressing process with a core and mold to provide for removal of said core without creating cracks in the isopressed alumina.

17. The method according to claim 16, further comprising inserting cathode and anode connections through apertures in said end disks followed by sealing with the mirror a Brewster window assembly.

18. The method according to claim 14, wherein said electrode structures are grooved circumferentially to enhance mechanical strength and sealing ability.

19. The method of claim 14, wherein said powdered ceramic is isopressed around the periphery of said metal piece.

* * * * *